(12) United States Patent
Helenihi

(10) Patent No.: US 8,123,236 B1
(45) Date of Patent: Feb. 28, 2012

(54) UNIVERSAL COOLER WHEELS

(76) Inventor: James Helenihi, Kurtistown, HI (US)

( * ) Notice: Subject to any disclaimer, the term of this patent is extended or adjusted under 35 U.S.C. 154(b) by 0 days.

(21) Appl. No.: 13/026,242

(22) Filed: Feb. 12, 2011

Related U.S. Application Data

(60) Provisional application No. 61/304,304, filed on Feb. 12, 2010.

(51) Int. Cl.
B62B 1/20 (2006.01)
(52) U.S. Cl. ..... 280/35; 280/63; 280/33.991; 280/47.17
(58) Field of Classification Search ............... 280/47.2, 280/47.18, 47.24, 63, 638, 40, 652, DIG. 3; 248/129
See application file for complete search history.

(56) References Cited

U.S. PATENT DOCUMENTS

| | | | | |
|---|---|---|---|---|
| 1,561,122 A * | 11/1925 | Stahl | ............................ | 280/35 |
| 2,670,969 A | 3/1954 | Costikyan | | |
| 3,539,194 A | 11/1970 | Stiles | | |
| 3,754,773 A * | 8/1973 | Bruno | ...................... | 280/47.131 |
| 3,841,650 A * | 10/1974 | Miskelly | ......................... | 280/37 |
| 3,891,245 A * | 6/1975 | Elsas | ......................... | 280/47.131 |
| 3,963,256 A * | 6/1976 | Stafford | ......................... | 280/35 |
| 4,166,638 A * | 9/1979 | De Prado | ......................... | 280/638 |
| 4,451,053 A * | 5/1984 | Alioa et al. | ................ | 280/47.26 |
| 4,545,592 A * | 10/1985 | Taskovic | ......................... | 280/35 |
| 4,724,681 A | 2/1988 | Bartholomew | | |
| 5,169,164 A * | 12/1992 | Bradford | ......................... | 280/35 |
| 5,323,886 A * | 6/1994 | Chen | ......................... | 190/18 A |
| 5,407,218 A * | 4/1995 | Jackson | ......................... | 280/30 |
| D358,921 S * | 5/1995 | Abbema | ......................... | D34/26 |
| 5,465,996 A * | 11/1995 | Wisz | ............................ | 280/651 |
| D379,704 S * | 6/1997 | Corlett et al. | .................. | D34/24 |
| 6,386,557 B1 * | 5/2002 | Weldon | ......................... | 280/30 |
| 6,446,988 B1 * | 9/2002 | Kho | ............................ | 280/47.26 |
| D491,727 S * | 6/2004 | Koenig et al. | .................. | D3/318 |
| 6,923,468 B1 * | 8/2005 | Barnett et al. | ................ | 280/651 |
| 7,334,802 B2 * | 2/2008 | Kaplan | ......................... | 280/47.26 |
| 7,407,032 B1 * | 8/2008 | Chambers et al. | ............ | 180/312 |
| 7,744,101 B2 * | 6/2010 | Robbins et al. | ............... | 280/47.2 |
| 2007/0001409 A1 * | 1/2007 | Kaplan | ........................... | 280/35 |

* cited by examiner

*Primary Examiner* — J. Allen Shriver, II
*Assistant Examiner* — James Triggs
(74) *Attorney, Agent, or Firm* — Alexander Boyer; Daniel Boudwin

(57) ABSTRACT

A universal transport device that comprises two wheels and interconnected straps for securing and mobilizing a standard, non-wheeled cooler. The two wheels are connected via a stabilizing bar, and are secured under a cooler using a series of connecting straps. The stabilizing bar provides separation of the wheels and support for the cooler load during transport. The straps are adjustable connections around the exterior of the cooler, and comprise a main strap and two or more additional adjoining straps which work to encompass the exterior of the cooler and keep it firmly in place on the stabilizing bar. A handle is secured to the straps to allow a user to tilt and pull the cooler without bending over.

5 Claims, 1 Drawing Sheet

UNIVERSAL COOLER WHEELS

CROSS REFERENCE TO RELATED APPLICATION

This application claims the benefit of U.S. Provisional Application No. 61/304,404 filed on Feb. 12, 2010, entitled "Universal Cooler Wheels"

BACKGROUND OF THE INVENTION

1. Field of the Invention

The present invention relates to attachable container dollies and wheeled totes that permit rolling transport of heavy loads. More specifically, the present invention relates to universal dollies for non-wheeled cooler containers.

2. Description of the Prior Art

Non-wheeled coolers are convenient for storing large amounts of food or supplies, especially those that require insulated transport. However, these coolers are typically quite large and quickly become too heavy to easily lift once contents are loaded. Coolers of these types are used most commonly for outdoor outings such as sporting events or picnics. These venues generally require the cooler to be transported over significant distances, and sometimes over uneven terrain.

Certain newer-style coolers include a set of two roller wheels along a base edge, however not all coolers are equipped with this feature, especially older and less expensive models. Hand carts and dollies are useful for carrying these types of containers, but do not offer the same flexibility as an integrated wheel system. Hand carts also consume considerable space when not in use, and are awkward to transport. A solution to this problem is required, one that addresses the known drawbacks of transporting coolers and containers.

Several patents in the art have been suggested for improving the mobility of rectangular containers, including luggage and heavily loaded coolers. U.S. Pat. No. 3,891,245 to Elsas and 5,169,164 to Bradford describe container carriers in which load is carried by an axle between a set of wheels, and straps are used to contain the load. These patents are useful for transporting containers, however they provide very little in the way of lateral support for a heavily loaded container. Both patents describe securing straps that span the lengthwise direction of the container, but fail to integrate sidewall support, which is vital for stabilizing heavy containers over uneven ground.

Three patents which suggest wheeled supports that include lateral support are U.S. Pat. Nos. 2,670,969 to Costikyan, 3,963,256 to Stafford, and 3,539,194 to Stiles. The Costikyan patent provides a wheeled support with lateral straps, but is limited to those containers that provide top-mounted lift handles for temporary securement of the disclosed straps. The Stafford patent is a four-wheeled platform suitable for luggage or any rectangular-shaped container. The sidewall supports disclosed in this patent are elastic and therefore limited in their ability to support lateral loads from the container. The Stiles patent is similar to the Costikyan patent in that it requires a container or luggage with a top-mounted handle, and does not integrate lateral and longitudinal support straps.

The following disclosure therefore attempts to remedy the drawbacks in wheeled container dollies and totes currently available. Specifically, the disclosed invention provides a two-wheeled containment system that is capable of conforming to any reasonable-sized cooler or luggage container, while providing large wheels for uneven terrain, integrated lateral and longitudinal support and an extended handle for ease of use.

SUMMARY OF THE INVENTION

In view of the foregoing disadvantages inherent in the known types of cooler transport dollies now present in the prior art, the present invention provides a new cooler transport dolly wherein the same can be utilized for providing convenience for the user when mobilizing a cooler or container across long distances and uneven terrain.

It is therefore an object of the present invention to provide a two-wheeled support for a cooler container that is externally mounted and suitable for a variety of different cooler sizes.

Another object of the present invention is to provide a device that longitudinally and laterally supports a cooler during transport.

Yet another object of the present invention is to provide a device that reduces user effort when transporting heavily loaded coolers.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
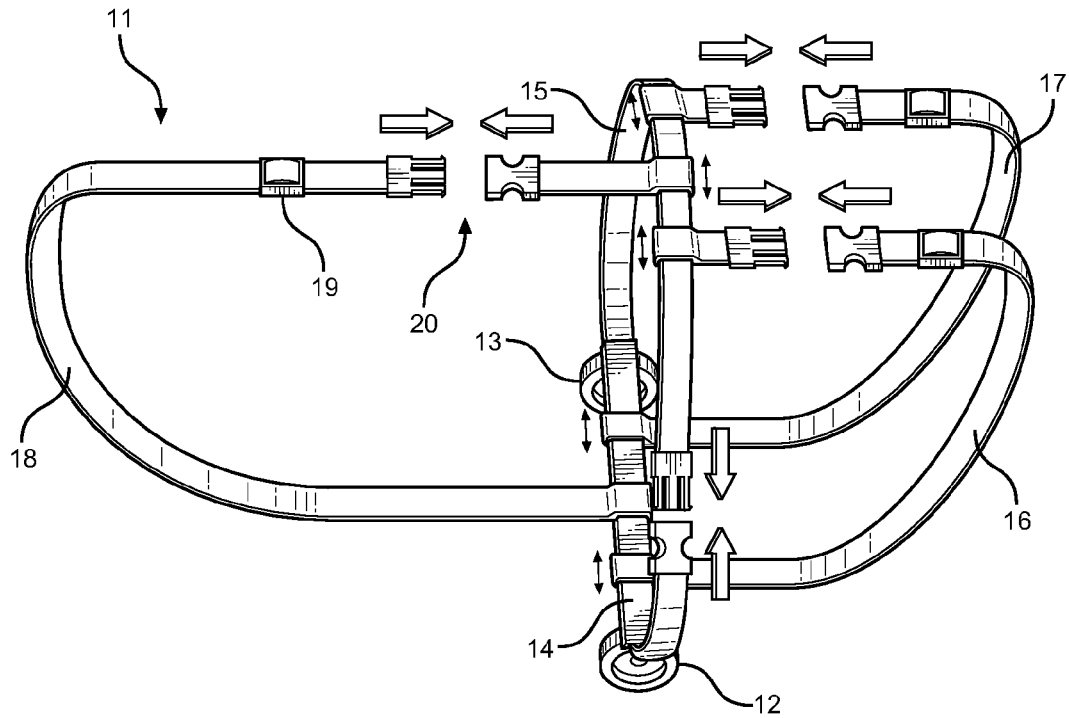
FIG. 1 shows an expanded side view of the cooler transport device in its unlatched condition.

Referring now to FIG. 1, there is shown a side view of the cooler transport device 11. A set of two wheels 12, 13 are horizontally opposed and secured to a stabilizing bar 14. The stabilizing bar 14 provides pinned support for the wheels 12, 13, allowing free rotation of each wheel in the fore-aft directions. The stabilizing bar 14 also acts as the main support for the transported load. A main strap 15 attaches and extends from the ends of the stabilizing bar 14, while three secondary straps 16, 17, 18 extend perpendicularly from the stabilizing bar 14. Each strap is equipped with adjustment slides 19 to shorten or lengthen the run of each strap around a container. At the ends of each strap are securement means 20 to connect each end together and form a structurally suitable union for supporting tension loads introduced by the inertia of the loaded container.

Figure 2:
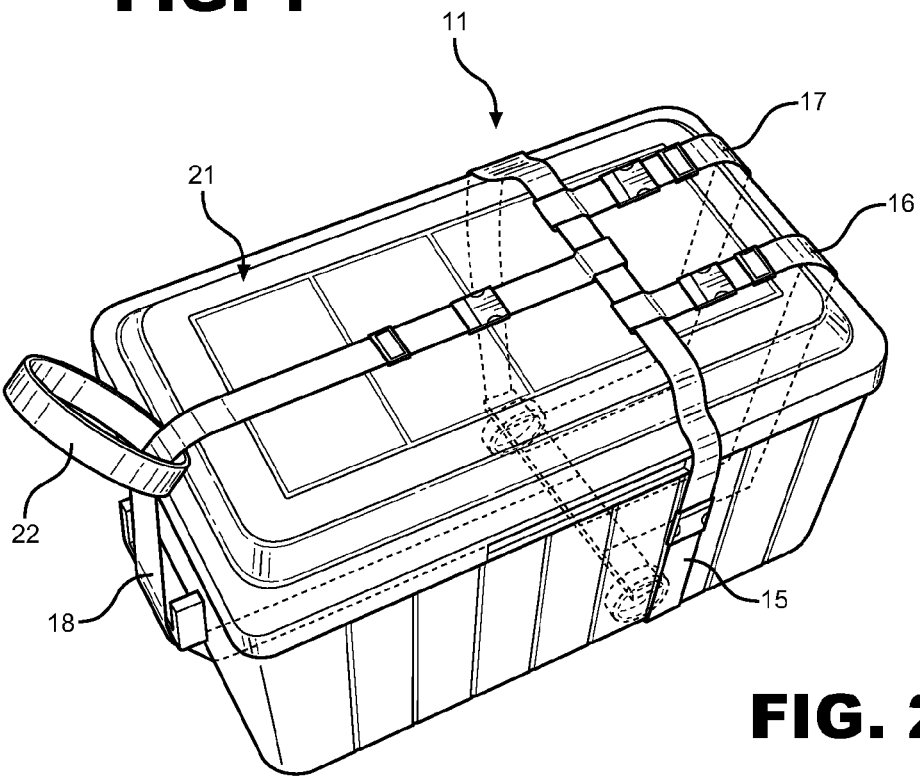
FIG. 2 shows an overhead view of the transport device secured to a rectangular cooler.

Referring now to FIG. 2, there is shown an overhead view of the cooler transport device 11 secured to a rectangular cooler 21. The main strap 15 spans the mid-section of the cooler and provides lateral support, while three secondary straps 16, 17, 18 extend lengthwise along the cooler to provide longitudinal support. The secondary straps extend from the stabilizing bar 14 beneath the cooler, and wrap around to connect to securement means 20 along the main strap 15. The straps are adjusted using slides 19 along their length to adjust each length and provide a secure fitment of the transport device 11 around the exterior of the cooler 21. Before the secondary strap 18 is secured to the main strap, a handle strap 22 is looped underneath the secondary strap. The handle strap 22 provides a user the ability to lift and pull one end of the cooler 21 near waist-level.

In use the stabilizing bar supports all vertical loads from the cooler while the straps provide lateral and longitudinal support as the cooler is transported. Uneven terrain can cause cooler to tilt and its contents shift, requiring sufficient support in both the fore-aft and side directions. The wheels provide rolling transport and reduce the friction associated with moving the cooler.

In an alternative configuration, the transport device may be oriented 90 degrees from the configuration of FIG. 2. The main strap may straddle the lengthwise portion of the cooler, while the secondary straps span midsection in the chordwise direction. This provides the user the ability to pull the cooler from a different side. The stabilizing bar runs parallel to the lengthwise direction of the cooler, and the direction of travel is changed. Orientation of the transport device is dependent on the user preference.

The strap attachment means may be a number of suitable structures for attaching two straps together. This includes push buckles, turn buckles, or snaps. The means for adjusting the straps may likewise take the form of any acceptable structure commonly known to one skilled in the art, such as slides or loops. The integration of the main strap to the secondary straps includes adjustable loops that allow the connection point to slide along the main strap length. This allows the connection point between the main strap and the secondary straps to be varied, accommodating different sized coolers and different attachment orientations on the cooler. The secondary straps can be spread over a wide area to improve the stability of the cooler, or pulled closer together for smaller sized containers.

When not in use, the transport device is condensed into a small volume and easily transported or stored. This improves the versatility of the device over traditional hand carts or dollies, which are larger structures that are not as easily transported or stowed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooler transport device, comprising:
two wheels laterally separated by a structural stabilizing bar wherein a series of securing straps surround a cooler container in the longitudinal and lateral directions, and are slideably mounted to said stabilizing bar;
said stabilizing bar being removably mountable to any sidewall of said cooler;
said securing straps including slideable length adjustment means adapted to permit a cooler to be mounted on said stabilizing bar in a plurality of orientations.

2. A cooler transport device, comprising:
two wheels laterally separated by a structural stabilizing bar with a first and second end, a main strap extends from said first end and a main strap attachment strap extends from said second end of said stabilizing bar, three secondary straps slideably attach to said stabilizing bar and extend perpendicular from said stabilizing bar, three secondary strap attachment straps are slideably mounted on the main strap;
said secondary and main straps include slideable length adjustment means and attachment means for detaching and reattaching each strap to each said attachment straps.
said stabilizing bar being removably mountable to any sidewall of said cooler;
said slideable length adjustment means adapted to permit a cooler to be mounted on said stabilizing bar in a plurality of orientations;
a strap handle that is removably secured to any of said securing straps and is adapted to slide along an engaged securing strap.

3. The apparatus of claim 2, wherein said main strap laterally supports a loaded cooler, and said secondary straps span longitudinally along said loaded cooler.

4. The apparatus of claim 2, wherein said main strap longitudinally supports a loaded cooler, and said secondary straps span laterally around said loaded cooler.

5. A cooler transport device, comprising:
Two wheels laterally separated by a structural stabilizing bar mounted beneath a cooler container, wherein a series of securing straps which surround a cooler container in the longitudinal and lateral directions, said straps are slideably mounted to said stabilizing bar;
said stabilizing bar being removably mountable to any sidewall of said cooler;
said securing straps including slideable length adjustment means adapted to permit a cooler to be mounted on said stabilizing bar in a plurality of orientations;
a strap handle that is removably secured to any of said securing straps and is adapted to slide along an engaged securing strap.

\* \* \* \* \*